United States Patent [19]
Denley

[11] Patent Number: 5,833,346
[45] Date of Patent: Nov. 10, 1998

[54] HORIZONTAL/VERTICAL POSITION INDICATOR FOR VEHICULAR HEADLAMP ASSEMBLY

[75] Inventor: Ronald S. Denley, Woodstock, Ill.

[73] Assignee: Elco Textron Inc., Rockford, Ill.

[21] Appl. No.: 741,280

[22] Filed: Oct. 30, 1996

[51] Int. Cl.$^6$ ...................................................... B60Q 1/06
[52] U.S. Cl. ............................ 362/66; 362/282; 362/284; 362/419; 362/427; 33/288
[58] Field of Search ........................ 33/288, 379; 362/66, 362/427, 271, 273, 275, 277, 282, 284, 419, 421

[56] References Cited

U.S. PATENT DOCUMENTS

| | | | |
|---|---|---|---|
| 5,032,964 | 7/1991 | Endo et al. | 362/66 |
| 5,055,980 | 10/1991 | Mochizuki | 362/66 |
| 5,063,480 | 11/1991 | McMahan et al. | 362/66 |
| 5,138,542 | 8/1992 | Daumueller et al. | 362/66 |
| 5,197,799 | 3/1993 | Dehaene | 362/66 |
| 5,343,372 | 8/1994 | Shirai et al. | 362/66 |
| 5,452,185 | 9/1995 | Arlon et al. | 362/66 |
| 5,660,455 | 8/1997 | Tsukamoto et al. | 362/66 |

Primary Examiner—Alan Cariaso
Attorney, Agent, or Firm—Trexler, Bushnell, Giangiorgi & Blacsktone, Ltd.

[57] ABSTRACT

Apparatus for providing a visual indication of the horizontal and vertical orientation of a movable component of a headlamp assembly wherein said headlamp assembly is of the general type including a stationary housing and a movable reflector component, said movable component being pivoted to the stationary housing for movement in the vertical and horizontal plane by means of a stationary universal pivot and a vertical adjust mechanism vertically spaced from said stationary pivot and including a universal pivotal mounting to said movable component, and a horizontal adjust mechanism horizontally spaced from said stationary pivot and including a universal pivot effecting operative connection to said movable reflector component. The stationary universal pivot and said horizontal pivot define the vertical pivot axis for said component. Further said stationary universal pivot and the horizontal adjust pivot in effect defining a vertical pivot axis about which said movable component is pivoted in the vertical plane. A novel horizontal position indicator system is provided, in the form of an arm pivotally mounted to said movable component such that said movable component can pivot in the vertical plane relative to said horizontal position indicator, with said horizontal position indicator being fixed against pivotal movement relative to said stationary housing component. The pivot axis for the pivotal attachment of said horizontal position indicator to said movable component is substantially coaxial with said vertical pivot axis about which said movable component is pivoted in the vertical plane as such said movable reflector component can pivot in the vertical plane independent of any movement of the horizontal position indicator which will remain relatively stationary, said horizontal position indicator moving only upon pivoting of the movable component in the horizontal plane.

18 Claims, 6 Drawing Sheets

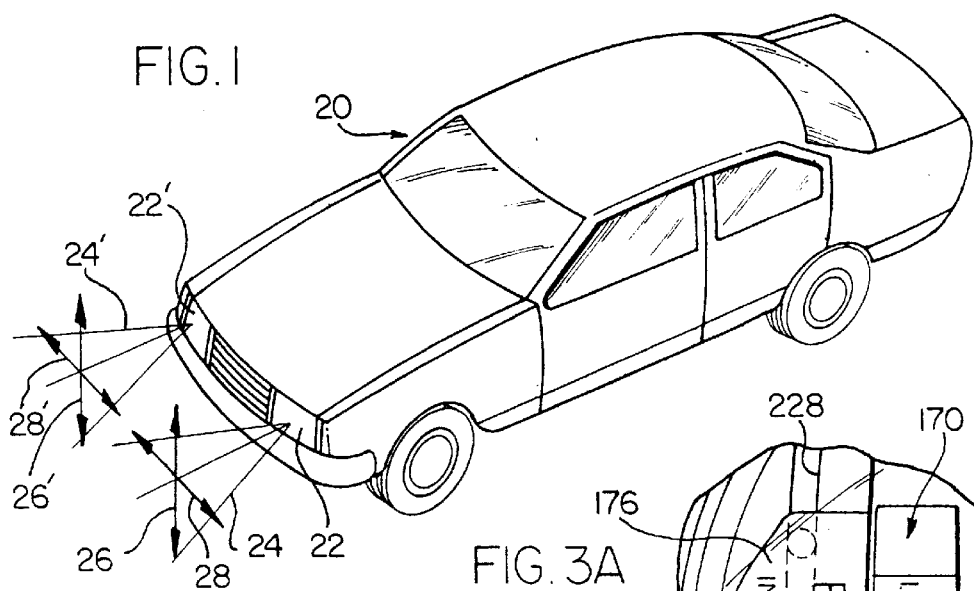
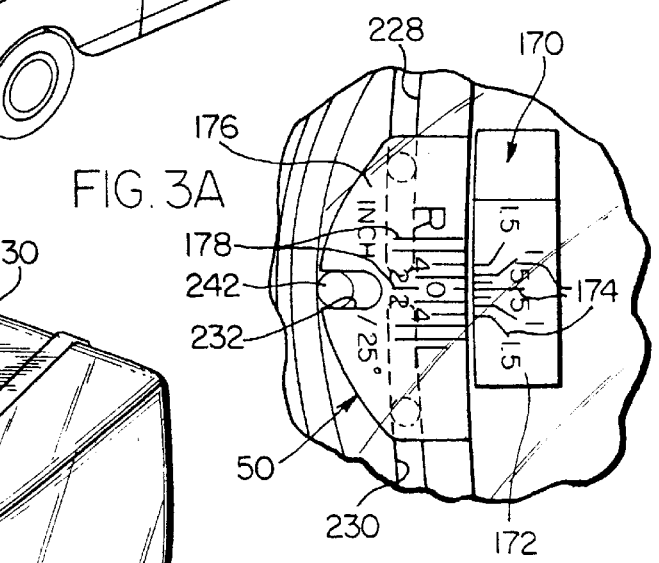
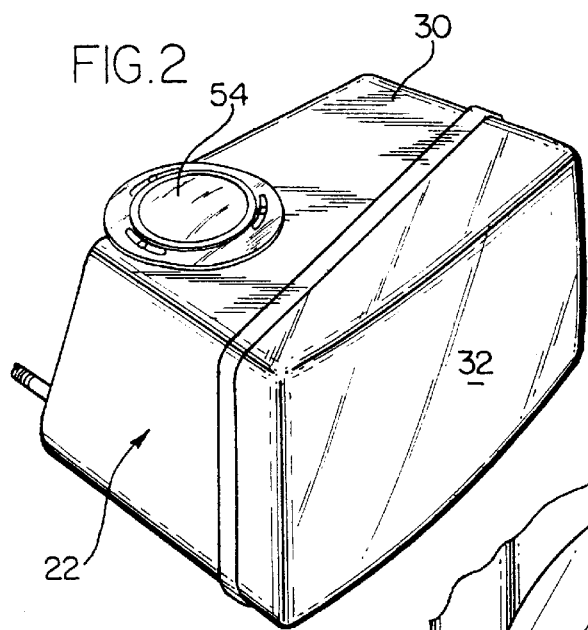
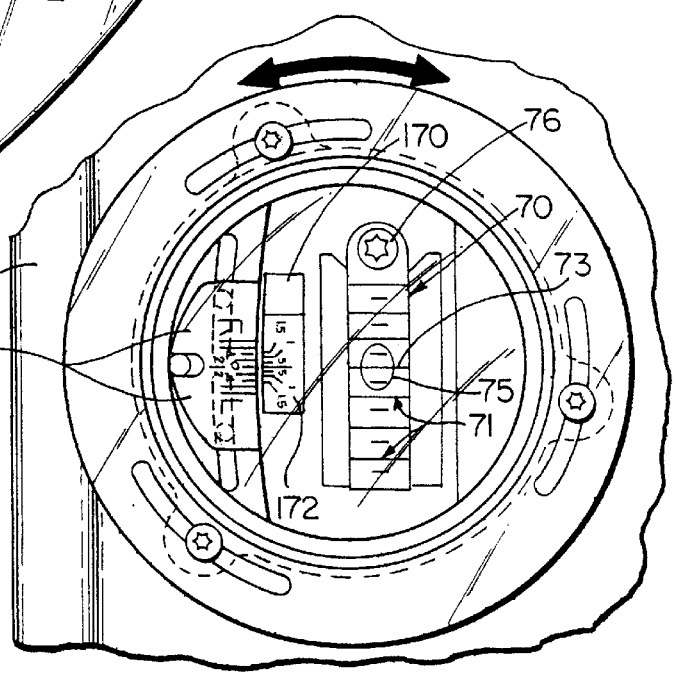

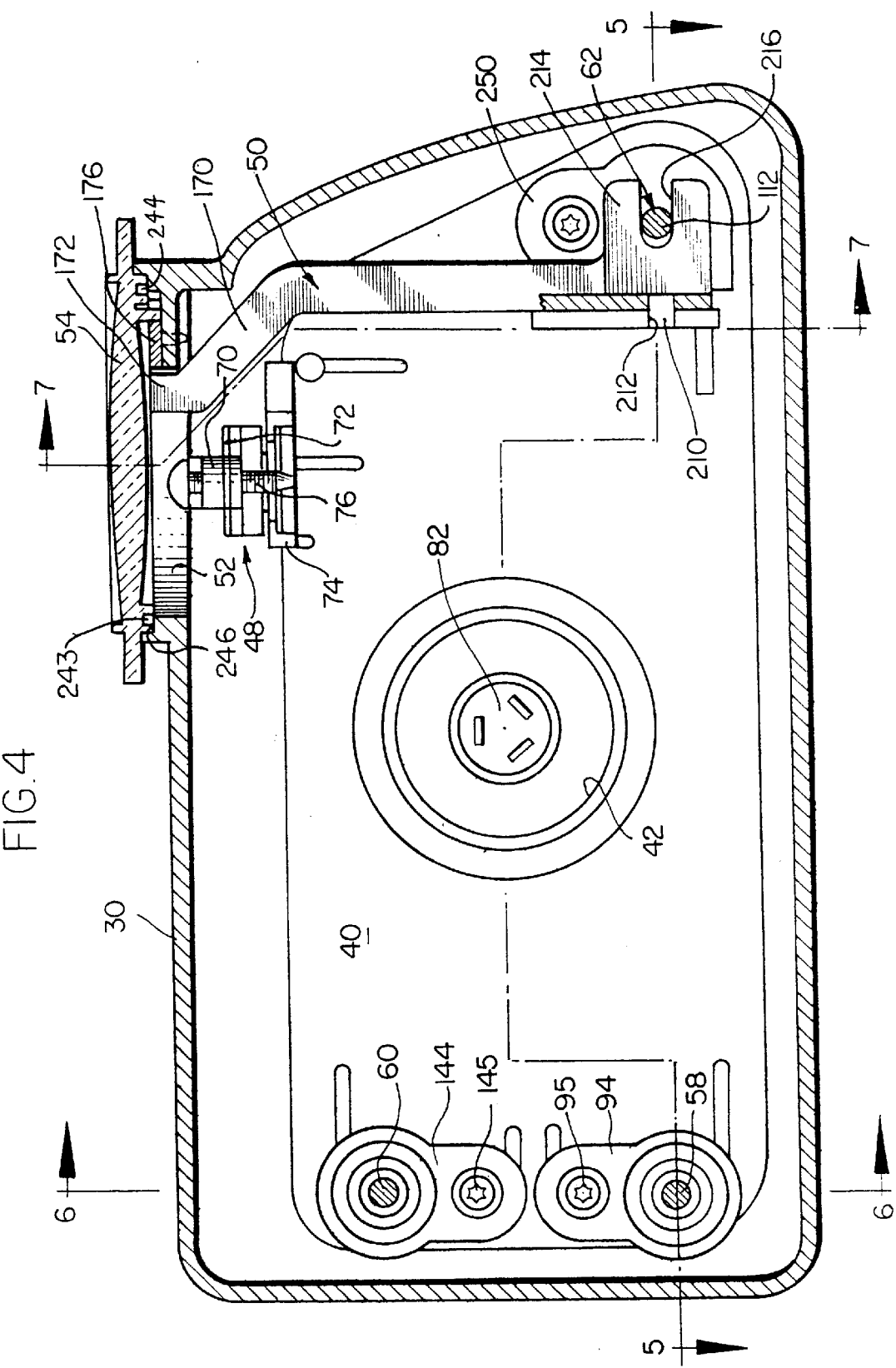

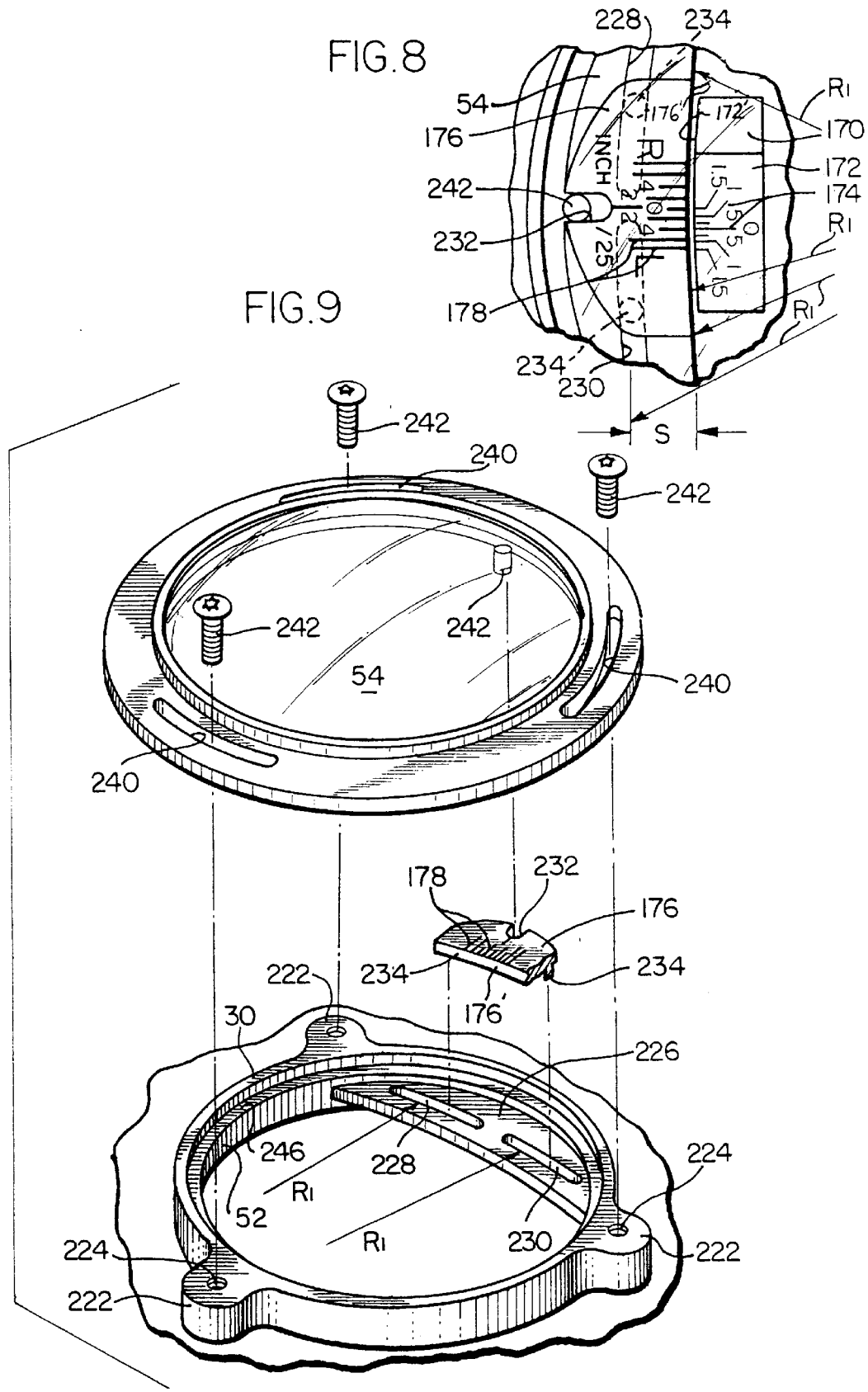

HORIZONTAL/VERTICAL POSITION INDICATOR FOR VEHICULAR HEADLAMP ASSEMBLY

BACKGROUND OF THE INVENTION

The present invention relates to a system and apparatus for use with an adjustable headlamp assembly which is capable of providing a visual indication of the vertical and horizontal disposition of a movable reflector component with respect to certain predetermined factory settings.

Modern day headlamp assemblies for vehicles have been engineered and designed to be aerodynamically efficient. In this regard, the headlamps are designed as sealed assemblies wherein the portion of the headlamp approximate the outer surface of the automobile is relatively stationary and aerodynamic. The headlamp normally would include a fixed housing to which the outer headlamp lens is affixed, a movable reflector mounted within the fixed housing and a headlamp bulb, the latter of which is also generally stationary. The movable reflector is mounted to the stationary housing by one or more universal or ball-type pivots. One of the pivots is stationary or fixed on the housing, with a first additional pivot point being disposed generally vertical of the fixed pivot and second additional pivot generally horizontal of the fixed pivot. As such, the movable reflector may be pivoted in the vertical and horizontal planes to aim the headlamp beam. The fixed point is provided by a stationary ball and socket arrangement. The first and second additional pivots, normally termed the vertical pivot and the horizontal pivot, are provided by mechanical adjustor mechanics which effect movement of the reflector in the horizontal and vertical planes. These adjustor mechanisms normally employ an adjustor screw or component for linear movement. The mechanical adjustors are mounted to the housing and are operatively connected to the movable reflector by ball and socket type pivots, or the like, such that linear movement of an adjustor component will produce the desired pivoting of the lens in the horizontal and/or vertical planes.

At the factory or vehicle assembly plant, headlamp aiming apparatus is provided so that the movable component or reflector of the headlamp can be preadjusted to a desired position in order to properly aim the beam of the headlamp in the vertical and horizontal direction. The adjustor mechanisms are operated until the movable component or reflector is in the desired position to produce a properly oriented beam.

Once the desired vertical and horizontal orientation for the headlamp is attained, the headlamps are provided with vertical and horizontal indicators that provide a visual indication that the movable reflector is in the desired or "zero" position. The indicator arrangements are operated or adjusted in some form to attain a visual indication of the zero position, which corresponds to the desired horizontal and vertical orientation for the movable reflector component. Thereafter, if the reflector component moves from the desired position, as for example due to vibration, jarring or the vehicle being in an accident, a mechanic will be provided with a visual indication that the headlamp is not in the desired position. The mechanic need only operate the adjustor mechanisms to return the movable reflector component to the desired horizontal and vertical zero positions.

The Department of Transportation of the Federal Government has set forth specific guidelines dealing with vehicle aiming in both the horizontal and vertical directions. These guidelines have been issued under regulation FMVSS108, the appropriate portions of this standard are set forth briefly hereinafter wherein the degree of accuracy required of the horizontal and vertical indicators can be apparent. The appropriate regulation states as follows:

On-vehicle aiming.

Each headlamp system that is capable of being aimed by equipment installed on the vehicle shall include a Vehicle Headlamp Aiming Device (VHAD) that conforms to the following requirements:

(a) Aim.

The VHAD shall provide for headlamp aim inspection and adjustment in both the vertical and horizontal axes.

(1) Vertical aim:

The VHAD shall include the necessary references and scales relative to the horizontal plane to assure correct vertical aim for photometry and aiming purposes. An off-vehicle measurement of the angle of the plane of the ground is permitted. In addition, an equal number of graduation form the "O" position representing angular changes in the axis in the upward and downward directions shall be provided.

(I) Each graduation shall represent a change in the vertical position of the mechanical axis not larger than 0.19 degree (1 in. At 25 ft.) to provide for variations in aim at least 1.2 degrees above and below the horizontal, and have an accuracy relative to the zero mark of less than 0.1 degree.

(2) Horizontal aim.

The VHAD shall include references and scales relative to the longitudinal axis of the vehicle necessary to assure correct horizontal aim for photometry and aiming purposes. An "O" mark shall be used to indicate alignment of the headlamps relative to the longitudinal axis of the vehicle. In addition, an equal number of graduations from the "O" position representing equal angular changes in the axis relative to the vehicle axis shall be provided.

(I) Each graduation shall represent a change in the horizontal position of the mechanical axis not greater than 0.38 degree (2 in. at 25 ft.) to provide for variations in aim at least 0.76 degree (4 in. at 25 ft.) to the left and right of the longitudinal axis of the vehicle, and shall have an accuracy relative to the zero mark of less than 0.1 degree.

With regard to the vertical aiming indicator, a popular form of indicator is a spirit or bubble level which is mounted to the movable reflector component of the headlamp and is viewable through the lens or an opening in the stationary headlamp housing. The mounting of the bubble level to the movable component is adjustable so that once the desired zero vertical position for the headlamp is attained, the bubble level can be "zeroed out" that is, adjusted to a point wherein the bubble is at the zero indicia. As such, any subsequent movement of the headlamp from the desired vertical position will produce a movement in the bubble and a mechanic will have an immediate visual indication that the headlamp is out of vertical adjustment.

While the bubble level operates and provides sufficient indication in the vertical plane, it can be appreciated that a bubble level will not indicate in the horizontal plane. In this regard, the industry has developed a number of horizontal indicators and specific reference is had to the following United States Patents:

U.S. Pat. No. 5,067,052, Nov. 19, 1991 to Suzuki et al.;
U.S. Pat. No. 5,077,642, Dec. 31, 1991 to Lisak;
U.S. Pat. No. 5,121,303, Jun. 9, 1992 to Shirai et al.;
U.S. Pat. No. 5,140,503, Aug. 18, 1992 to Lisak;
U.S. Pat. No. 5,317,486, May 31, 1994 to Schmidt; and
U.S. Pat. No. 5,359,499, Oct. 25, 1994 to Denley.

The disclosures of the above-noted patents are incorporated herein by reference. The patents teach devices which include a single universal type pivot between the movable reflector and a stationary housing, the pivot point providing a fixed reference from which the vertical and horizontal aiming adjustments are made. In this regard, a vertical adjustor is spaced vertically above the fixed pivot while the horizontal adjustor is spaced horizontally from the pivot. As such, horizontal pivoting takes place about an axis defined by the fixed pivot and the attachment of the vertical adjustor to the movable component, while correspondingly vertical pivoting takes place about an axis defined by the horizontal adjustor and the fixed pivot. The above-mentioned patents provide indicators which will provide both a vertical and horizontal indication, the vertical indication being provided by a spirit level, horizontal indication being provided by various arrangements. Reference to these patents will provide a better understanding and discussion of the particular problem involved in the provision of a vehicle headlamp aiming system with vertical and horizontal indicators.

Initially, as is demonstrated and evidenced by the first four patents listed above, the art employed a horizontal indicating arrangement that was totally separate and distinct from the location and construction of the vertical indicator. In certain of these patents, horizontal indication was obtained directly from the horizontal adjustor mechanism or by means of a spring biased component which tracks the horizontal movement of the reflector. As the art developed, it became desirable from an operational standpoint to have the horizontal and vertical indicator at the same location. In this regard, reference is had to the above cited U.S. Pat. Nos. 5,317,486 to Schmidt and 5,359,499 to Denley which illustrate a horizontal indicating mechanism that is associated directly with the vertical indicator. The later is in the form a of a bubble level and a viewing window in the headlamp housing which permits the viewing of the bubble level.

In the earlier patent to Schmidt, the bubble level is mounted to an extension on the reflector component and horizontal movement indicia are provided adjacent the bubble level. Correspondingly, the viewing window is provided with an additional or cooperating indicia or sight line, which is selectably movable, so that when the desired horizontal position is achieved, the indicia or sight line on the viewing window is aligned with the horizontal movement indicia adjacent the bubble level. Subsequent movement of the reflector component in the horizontal plane produces movement which can be detected by the misalignment of the respective indicia. The patent to Denley involves a somewhat similar arrangement. In the Denley device, horizontal movement indicia are provided adjacent the spirit or bubble level and are thereby affixed for movement with the reflector component. A second indicator is carried on the stationary housing, the indicator being selectably positionable to align a zero indicia thereon with the corresponding zero position on the indica carried by the reflector. Accordingly, any movement of the reflector in the horizontal plane will be indicated by a misalignment of the respective indica.

While the prior art dual indicator designs have worked generally satisfactorily, these designs do not, at all times and under all circumstances, provide the degree of precision adjustment and indication as required by the federal standard, noted above. An analysis of these dual indicator designs has resulted in a determination that a problem exists when the horizontal indicator is closely positioned with respect to the vertical indicator. This occurs due to the fact that movement of the reflector component in the vertical plane will, in many instances, produce movement of the associated horizontal indicia such that a false indication of horizontal misalignment is given, when in fact, the horizontal position of the headlamp has not been altered or changed. It has been determined, that this is due to the fact that the horizontal indicia, and more precisely the horizontal indicator, associated with the movable reflector component are not positioned properly with respect to the vertical pivotal axis for the reflector, and the inability of the reflector component to pivot in the vertical plane independent of the horizontal indicator or indicia carried thereon. Thus, these prior art dual indication designs where the horizontal indicator is carried on the top of the reflector, movement of the reflector in the vertical plane will cause the indicator indicia to be moved out of alignment with the corresponding indicia on the stationary component, thus producing a false indication of horizontal movement or misalignment.

It has been determined that in order to avoid the introduction of the above-discussed error, it is important that the horizontal indicator be mounted so that the reflector component can pivot in the vertical plane independently of the horizontal indicator, and also that said indicator be held in a fixed position during vertical movement of the headlamp. Further, the indicator must be carried by or associated with the reflector component so that the indicator will move relative to the stationary indicia when the headlamp is adjusted in the horizontal plane. A better understanding of this concept will be had from the discussion in the specification, and especially that with regard to the schematic representation of FIG. 10 of the drawings.

SUMMARY OF THE DISCLOSURE

A general object of the disclosure of the present invention is to provide a headlamp calibration assembly which simplifies the overall headlamp construction while maintaining a high degree of accuracy in the measurement, detection and adjustment of the horizontal and vertical positions for the movable reflector component. Another general object of the invention is to provide a headlamp indicator system which consolidates the vertical and horizontal position indicators at a single location for simultaneous viewing by the mechanic while he is adjusting the position of the headlamp reflector. An additional object of the invention is to provide an assembly wherein the horizontal indicator is mounted for pivotal movement relative to and independent of the movable reflector component in the vertical plane, while being mounted to the reflector for movement therewith when said reflector pivots in the horizontal plane.

The present invention involves a headlamp calibration or indication system for use with modern day type headlamps employing a stationary housing and a movable reflector component. The calibration or indicator assembly provides a visual indication of the relative position of the reflector from predetermined horizontal and vertical zero positions which are preset at the factory. In this regard, the movable reflector component includes a bubble level type vertical position indicator which is well known in the art to provide a visual indication of the relative vertical orientation of the headlamp. The novel horizontal indicator involves an indicator member which is pivotally mounted with respect to the movable reflector component so that the reflector can pivot independently of said indicator in the vertical plane without producing movement of the horizontal indicator which is fixed against movement in the vertical plane. This result is attained by permitting the vertical plane of the reflector to pivot about an axis which passes through the fixed pivot and the horizontal indicator pivot, and which lies in the horizontal plane. In addition, in order to obtain the desired accuracy, a novel arrangement for the generally stationary, yet selectively movable indicia mounted to the housing is provided so that movement of the indicia carrying member is radially about the fixed pivot, and lies in a plane which is parallel to the horizontal plane. The horizontal stationary indicia are carried on a calibration member. The relative movement of the calibration member with respect to the horizontal indicator member is about the same radius or axis of movement of the reflector component in the horizontal plane. Phrased differently, the slight shifting of the calibration member required to attain zero positioning will be along an arch corresponding to the arch of movement of the reflector component as it is adjusted in the horizontal plane. This is an additional factor which contributes to the high degree of accuracy and precision of the indicator mechanism of the present invention.

The above discussed objects and aims and advantages of the present invention will become more apparent from the following detailed description of the embodiments illustrated in the accompanying drawings.

BRIEF DESCRIPTION OF THE DRAWINGS

FIG. 1 is a general, somewhat schematic representation of an automobile, with an indication of the vertical and horizontal adjustment of the respective right and left-hand headlamp assemblies.

FIG. 2 is a perspective view, again somewhat schematic, of a typical headlamp assembly of the type and kind mounted to the front chassis of an automobile and illustrating the stationary components of the assembly, as well as a viewing window in the headlamp housing used to view the horizontal and vertical indicator.

FIG. 3 is a top plan view of the viewing window and illustrating a bubble level type vertical position indicator in combination with a horizontal indicator system of the present invention.

FIG. 3A has an enlarged view of the horizontal indicator of FIG. 3.

FIG. 4 is a sectional view taken through the rear portion of the headlamp of FIG. 2 illustrating the respective pivot points, as well as the horizontal and vertical indicators of the present invention.

FIG. 8 is an enlarged view similar to FIG. 3A but illustrating the horizontal indicator and the calibration scale when the movable reflector component has been moved out of the horizontal zero position.

FIG. 9 is an exploded perspective view illustrating the construction of the viewing window and its interconnection to the selectively adjustable calibration scale and the structure which permits said selective adjustment thereof.

Figure 5:
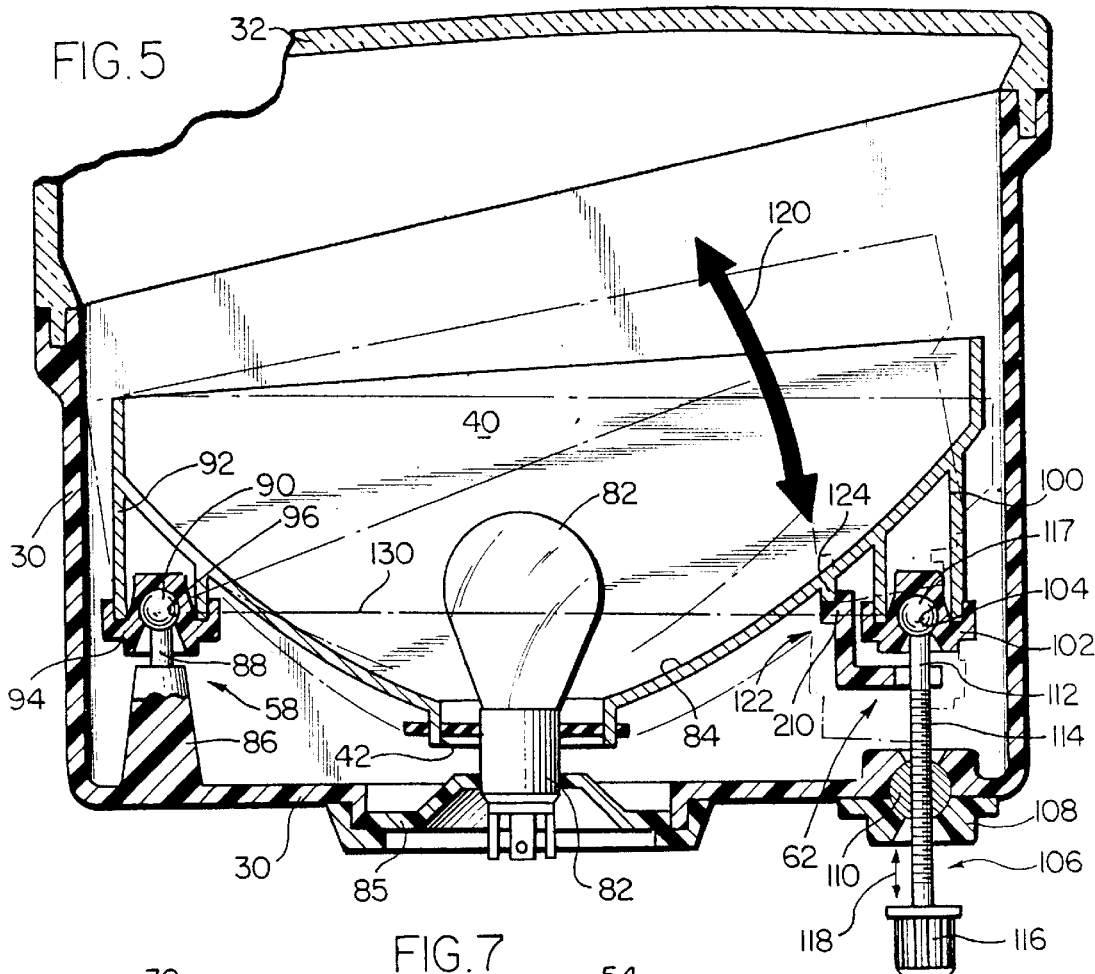
FIG. 5 is a partial sectional view taken along the line 5—5 of FIG. 4 and illustrating not only the fixed pivot, but the horizontal adjustor mechanism and associate horizontal pivot, as well the relative pivotal movement of the reflector component in the horizontal plane.

While a preferred form of the invention has been illustrated in the drawings, it is understood that the invention is susceptible to various modifications and alternate constructions. A preferred form of the invention is shown herewith in the drawings and will be discussed below in greater detail. It should be kept in mind and understood, however, that it is not the intention of the inventor to limit the invention to the specific form disclosed in the drawings, but rather it is intended that the invention cover all modifications alternative construction and equivalence falling within the spirit and scope of the invention.

DETAILED DESCRIPTION OF THE ILLUSTRATED EMBODIMENT

Referring now the drawings, FIG. 1 shows a general view of an automobile 20 which has right and left hand headlamps 22 respectively. The beam emitted from the respective headlamps is designated 24 and 24'. The internal components of the headlamp assembly as will be discussed more fully hereinafter, provide for adjustment in the vertical direction as indicated by the arrows 26 and 26' and also in the horizontal direction, as indicated by the arrows 28 and 28'.

A representation of a typical headlamp assembly which would be mounted in the internal front portion of the chassis of the automobile 20 is indicated in FIG. 2. The headlamp assembly 22 of FIG. 2 includes a stationary housing 30 and a stationary lens 32. Mounted interiorly of the housing 30 is a movable reflector member (not shown in FIG. 2 but shown in FIGS. 5–7) which is associated with a high intensity bulb (also not shown in FIG. 2, but shown in FIGS. 5 and 6). In addition, at the rear of the headlamp housing 30 there are provided adjustment mechanisms for adjusting the vertical and horizontal disposition of the reflector which in turn will determine the orientation or aim of the beam emitted from the headlamp, the horizontal adjust mechanism being visible in FIG. 5.

As discussed above, the headlamp assembly 22 will include horizontal and vertical indicators which will provide a visual indication as to the relative vertical and horizontal positioning of the headlamp reflector with respect to a desired zero positioning. This structure is shown in FIGS. 3 and 3A, however, a discussion with respect to FIGS. 3 and 3A will be deferred following a discussion with respect to FIG. 4–7 which illustrate the internal construction of the headlamp 22 which will permit a better understanding of the operation and function of the horizontal and vertical indicators.

FIG. 4 is a sectional view through a rear portion of the headlamp of FIG. 2 looking in a generally forward direction and illustrating the novel horizontal indicator arrangement 50 of the present invention. The structure of the horizontal indicator arrangement 50 will be detailed more fully hereinafter with respect to other figures of the drawings, the discussion with respect to FIGS. 4–7 to follow being employed to provide an understanding as to the internal construction and overall operation of the headlamp design.

Accordingly, what is shown in FIG. 4 is the rear portion of the movable reflector element, indicated generally 40. The reflector element 40 has a generally central opening 42 through which a high intensity bulb is disposed (not shown in FIG. 4, but illustrated in FIGS. 5 and 6). Mounted to the movable reflector 40 are the vertical indicator assembly, designated generally 48 and the horizontal indicator assembly, the overall components of which are designated generally 50. The housing 30 is provided with an opening 52 to which is adjustably mounted a transparent cover or viewing window 54. The viewing window 54 permits a mechanic or observer to view both the vertical indicator assembly 48 and the horizontal indicator assembly 50 at essentially the same location, while evaluating the aim condition, or making adjustments to the vertical and horizontal orientation of the movable reflector. Here again the structure of the horizontal and vertical adjustment mechanisms for the movable reflector 40 will be detailed more specifically with regard to FIG. 5–7.

In FIG. 4 there is shown a fixed pivot point for the reflector 40, designated generally 58. Disposed vertically above the fixed pivot point 58 is the vertical pivot, indicated generally at 60, with a horizontal pivot 62 being disposed horizontally of the fixed pivot 58. The interaction of these respective pivot points will become clear from the discussion of the invention to follow.

The vertical indicator assembly 48 is in accordance with standard prior designs in that it is in the form of an adjustable bubble level assembly generally of the type and kind shown in prior art patent to Schmidt, U.S. Pat. No. 5,317,486. In this regard, the vertical indicating assembly 48 includes a bubble vial 70 (FIGS. 4 and 6, and probably best viewed in FIG. 6), carried by a spring clip 72 and mounted to a bracket portion 74 provided on the movable reflector component 40. An adjustment screw 76 is provided which when rotated will cause the bubble vial to pivot or move vertically as indicated by the arrow 78 in FIG. 6. Accordingly, once the movable reflector of the headlamp is adjusted to the desired vertical position at the factory, a technician need merely to rotate the screw 76 to pivot the spirit level 70 until the bubble 75 is at the zero position, as shown in FIG. 3. Thereafter, any movement of the reflector member out of its desired vertical orientation due to vibration, jarring, bumping, etc. will produce a visual indication due to movement of the bubble 75 from the zero position. As mentioned above, the construction of the bubble level is generally state of the art, with the viewing window 54 permitting a mechanic to readily ascertain an indication as to whether the headlamp is or is not in the desired vertical orientation. The position of the bubble also indicates the direction of movement in the vertical plane required to bring the movable reflector component 40 back to its desired or "zero" position.

Figure 7:
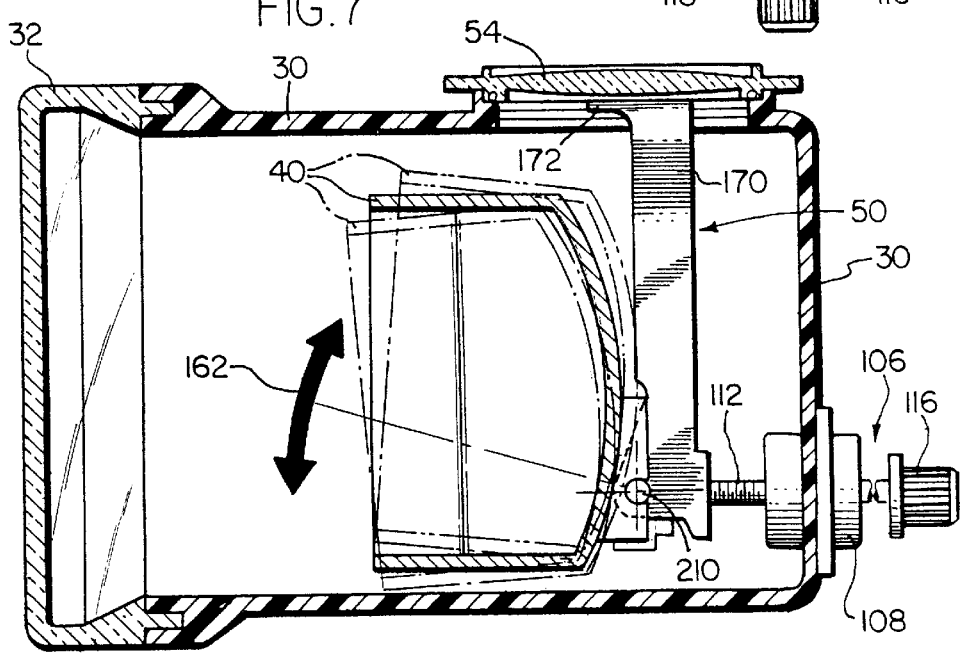
FIG. 7 is a view taken along the lines 7—7 of the FIG. 4 again illustrating the movement of the reflector component in the vertical plane but relative to the horizontal indicator, wherein said movement takes place without producing corresponding movement of the horizontal indicator.
Figure 6:
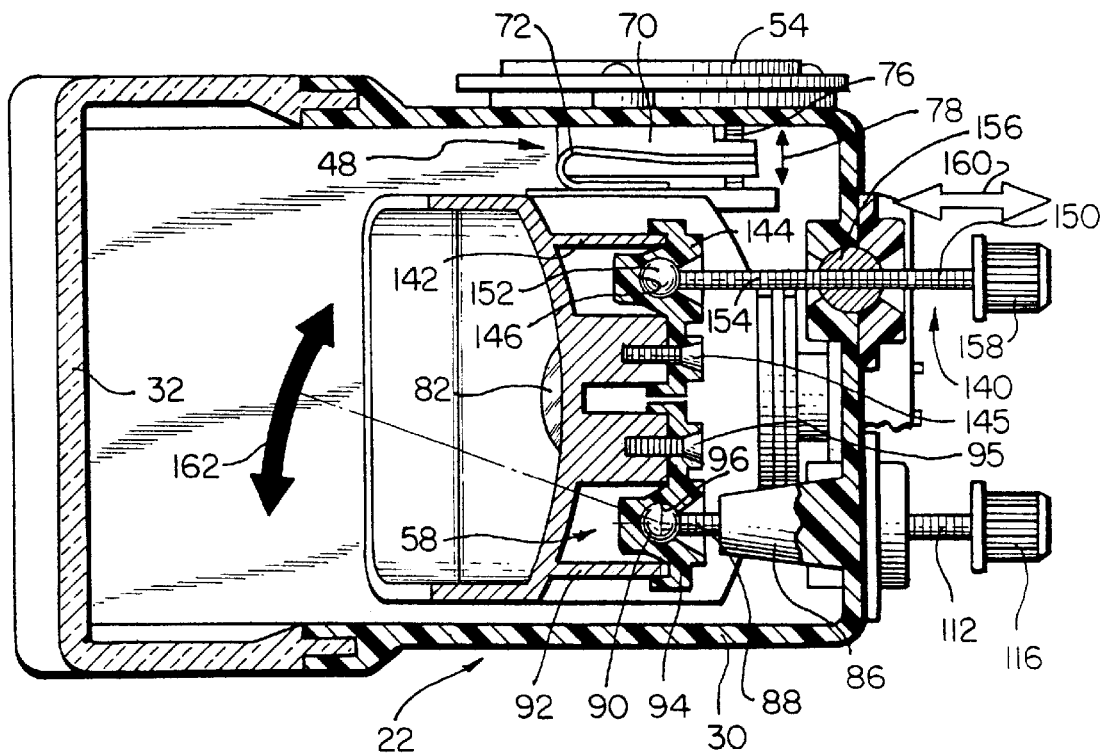
FIG. 6 is a sectional view taken along the lines 6—6 of FIG. 4 and illustrating the fixed pivot as well as the vertical adjustor assembly and the vertical pivot provided thereby for movement of the reflector component in the vertical plane.

Attention is now directed to FIGS. 5–7 and initially FIG. 5, which is a staggered, horizontal sectional view along the line 5—5 of FIG. 4. It should be noted that this section line extends through the stationary pivot 58, the opening 42 and the central portion of the movable reflector component 40 and the horizontal pivot 62. In FIG. 5 there is also shown the housing 30 and the stationary or outer lens member 32 which is affixed to the housing. The rear portion of the housing 30 includes an aperture or opening 80 to which is mounted a high intensity light bulb 82. The movable reflector 40 is provided with a concave, reflective surface 84, with the bulb 82 extending into the general concavity of the movable reflector 40. A flexible shield 85 is provided between the high intensity bulb 82 and the opening 42 to maintain the sealed integrity of the headlamp assembly. The movable reflector 40 is mounted to the stationary housing 30 by means of the aforementioned pivots which include the fixed pivot 58, the horizontal pivot 62, both of which will be discussed with respect to FIG. 5, and the vertical pivot 60, the latter of which is shown in FIG. 6.

With respect to the fixed or stationary pivot indicated generally at 58, the pivot arrangement is comprised of boss 86 on the stationary housing 30. Affixed to the boss 86 is a stud 88 having a spherical end portion 90. The movable reflector 40 has an extension or mounting bracket, designated generally 92 to which is affixed a socket member 94. The spherical head of the stud 88 is disposed within a similar shaped cavity 96 in the socket member 94 to provide a universal or ball-type pivot. When the term "universal-type" pivot is used, this is used to refer to a type of pivot wherein the components are free to pivot in both the vertical and horizontal planes, or a combination thereof. The term is not limited to the illustrated ball-type pivots, which are but one form of universal pivot, and it is anticipated and intended that other types of pivot arrangements may be employed, which provide for movement in the horizontal and vertical planes.

On the opposite side of the housing 30 is the horizontal pivot assembly, designated generally 62. In this regard, the movable reflector 40 has a similar bracket or boss portion 100 which is similar to the bracket portion 92 mentioned previously. A socket member 102 is mounted to the bracket portion 100, which socket member includes a spherical cavity 104. The horizontal adjustment mechanism, designated generally 106, is also mounted to the stationary housing 30. The mechanism 106 includes a mounting bracket 108 in which is disposed an internally threaded component 110. An adjusting screw 112 has a threaded shank 114 engaged with the internal thread of the member 110. The adjusting screw 112 also has a spherical end portion 117 is disposed within the spherical recess 104. The opposite end of the adjustment member 112 is provided with a knob 116 to facilitate operation of the adjustment member.

The disposition of the spherical end portion 117 in the spherical recess 104 of the bracket 102 provides a second ball or universal-type pivot mounting connection for the reflector 40, and essential defines the horizontal pivot 62. In practice, it can be appreciated that by rotating the knob 116, the threaded engagement between threads 114 and the internally threaded member 110 will produce linear movement of the adjustment member 112 as indicated at 118. This linear movement will in turn produce pivoting of the reflector member 40 about the fixed pivot 58 in the horizontal plane, as indicated in phantom in FIG. 5. Please note that the degree of pivotal movement in FIG. 5 has been exaggerated for purposes of illustration and is also indicated by the arrow 120. While ball-type pivots are preferred, it is envisioned that the pivotal connection between the adjustment member 112 and the reflector 40 may be provided by alternate equivalent types of pivotal joints.

Also viewable in FIG. 5, in section, is the indicator arm of the overall horizontal indicator mechanism 50 which as will be discussed more fully hereinafter, is also pivotally mounted to the reflector 40 at location 122. This pivot mounting is effected by the provision of a boss 124 on the arm which is disposed within a socket provided on the reflector 40. It should be noted that the respective pivot points at the fixed pivot 58 and the horizontal pivot 62 are defined by the spherical end portions disposed within the sockets having the spherical cavities 96 and 104. These two pivot points in effect define an axis 130 which extends through the pivot 122 for the horizontal indicator 50, for reasons to be explained more fully hereinafter.

Figure 10:
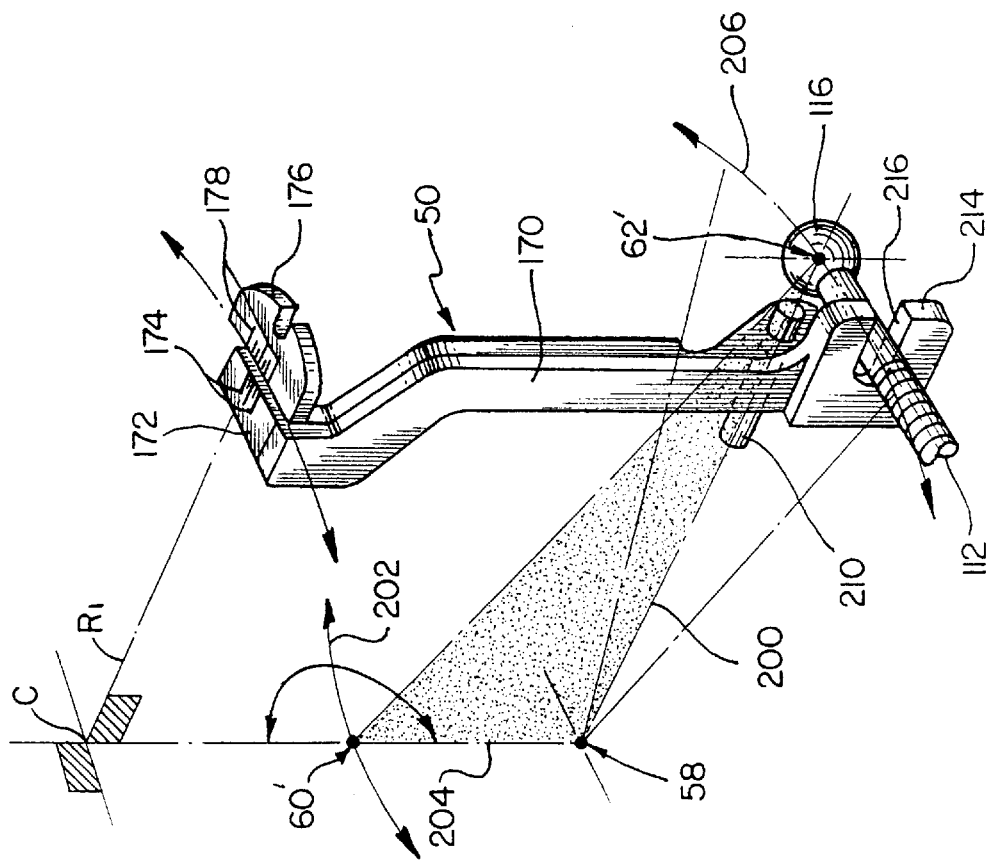
FIG. 10 is a schematic view illustrating the horizontal indication system of the present invention and the basic principles of said invention, wherein the stationary pivot point and the vertical adjust point are illustrated schematically.

As will become apparent from the discussion to follow with respect to FIG. 10, the axis 130 in effect defines the axis about which vertical pivoting of the reflector 40 can take place. It is with regard to the vertical movement of the reflector 40 and the structure which provides for same that attention will now be directed to FIG. 6.

FIG. 6 is a sectional view taken along the line 6—6 of FIG. 4 through the stationary or fixed pivot location 58 and the vertical pivot location 60. Accordingly, the structure of the fixed pivot 58, as previously discussed with regard to FIG. 5, and the components therein have been numbered accordingly. With respect o FIG. 6, it should be noted that the knob 116 of the horizontal pivot is viewable in FIG. 6, but this knob is not affixed to the stud 88 of the fixed pivot, with its ball end portion 90 disposed in the spherical recess 96 of the socket component 94. In this view, it can be seen that the socket component 94 is held in position by the screw member 95. More specifically, the movable reflector element 40 is shown in the vertical section however the section line as noted in FIG. 4, is not through the center of the component, but is offset thus only a partial portion of the bulb 82 is visible.

The vertical adjust mechanism, designated generally 140 and discussed with regard to FIG. 6, is similar to the horizontal adjust mechanism 106 discussed with regard to FIG. 5. In this regard, the movable reflector 40 is provided with a mounting bracket or portion 142 to which a socket 144 is mounted by screw 145. The socket has a spherical cavity 146. An adjustment member 150 is provided which has a spherical end portion 152 disposed within the spherical socket 146. The shank of the adjustment member 150 is threaded as indicated at 154 which threaded shank portion is engaged with an internally threaded component 156. The end of the shank opposite the spherical portion 152 has a knob 158 such that the adjustment member may be rotated to produce linear movement in the direction as indicated by arrow 160. Movement in the direction of arrow 160 will thus produce pivotal movement of the reflector in the vertical plane. This movement takes place about the fixed pivot 58 and the axis 130 defined by said fixed pivot and the horizontal pivot 62 (FIG. 5), this vertical movement being indicated by the arrow 162, FIG. 5.

In the upper portion of FIG. 6, mounted to the upper extremities of the movable reflector member 40, there is shown the vertical indicator mechanism 48. The vertical indication 48, it will be recalled, is in the form of the adjustably mounted bubble level 70 carried by this spring clip 72 and movable between its adjusted positions by operation of the screw member 76, movement thereof being indicated by arrow 78. In addition, the viewing window 54 can also be seen in FIG. 6.

Thus, from the above discussion of FIGS. 5 and 6, it can be appreciated that a mechanic by operating the knobs 158 and 116 of the adjustment mechanisms 106 and 140 associated therewith can pivot the movable reflector member 40 in the vertical plane as indicated at 162, FIG. 6, and/or in the horizontal plane as indicated at 120 in FIG. 5. From the preceding discussion in conjunction with FIGS. 5 and 6 the overall construction and operation of the headlamp 22 should be apparent, as well as the manner in which the vertical indicating system 48 operates to provide a visual indication as to the relative vertical positioning of the movable reflector component 40 with respect to the preset factory or zero position. Accordingly, attention will now be directed to the novel horizontal indicator system of the present invention. This system is illustrated generally schematically in FIG. 10 and also in FIG. 7, the latter of which being a partial sectional view taken along the line 7—7 of FIG. 4. Also, various components of the novel horizontal indicator system are also viewable in FIGS. 4 and 5 which will be discussed in conjunction with the above-mentioned FIGURES.

Before discussing the basic theory behind the horizontal indicator system of the present invention as illustrated in FIG. 10, attention is directed briefly to FIGS. 3 and 3A which illustrate what a mechanic will view when looking through the viewing window 54 while manipulating the adjustment mechanisms 106 and 140 via knobs 116 and 158 to move to adjust the vertical and horizontal orientation of the movable reflector 40. When looking into viewing window 54 the mechanic or technician will immediately ascertain the relative condition of the bubble level 70. The level 70 has graduation or indicia 71 thereon which include a zero position indicated at 73, as well as the bubble element 75. It must be kept in mind that the headlamp was "zeroed out" at the factory once the movable reflector component 40 was in the desired preset vertical and horizontal orientation. Accordingly, any movement of the reflector component 40 from the desired vertical position will result in movement of the bubble 75 either to the right or left of the zero position indicator 73. Such a situation would indicate to the mechanic the need for adjustment in the vertical plane.

The horizontal indicator system of the present invention it will be recalled is designated generally 50 and is also viewable in FIGS. 3 and 3A through window 54. Basically, the horizontal indicator system includes an indicator arm or member 170 having an upper portion 172 with indicia 174 thereon, best viewed in FIG. 3A. As explained more fully hereinafter, the horizontal indicator member or arm 170 will move only upon adjustment or movement of the reflector component 40 in the horizontal plane, and is constructed such that movement of said reflector 40 in the vertical plane will not produce movement of the indicator 170.

Operatively associated with the indicator 170 and carried by the stationary housing 30 is a calibration member 176. The detailed structure of the calibration member and its mounting to the housing 30 will be discussed in greater detail with respect to FIG. 9. It should be noted, however, that the calibration member 176 is operatively coupled to the viewing window 54 so that rotative movement of the viewing window 54 will produce slight movements of the calibration member 176 in an arcuate path about the fixed pivot. While the calibration member 176 is adjustably mounted, its position can be selected and then fixed as would occur at the factory when the headlamp is adjusted to the predetermined zero position. The interconnection of the indicator member 176 to the viewing window 54 and its mounting to the housing 30 will be the subject of discussion with respect to FIG. 9.

As can be seen in FIGS. 3 and 3A, the calibration member 176 is positioned adjacent to and cooperates with the indicator 170 and the upper portion 172 thereof with the indicia 174 thereon. Thus, assuming a zeroing out of the headlamp at the factory, any movement of the indicator 170 as would occur when the movable reflector component 40 moves in the horizontal plane away from the zero orientation will be apparent due to a misalignment of the respective indicia 174 on indicator 170 and indicia 178 on the calibration member 176. It is important to note that the respective indicia not only indicate movement from the zero position, but also the extent of movement. The indicia 174 operate as a vernier with indicia 176 to indicate a movement of 0.5" at 25' or 0.095 degrees. Note that the federal government specification (invention background) calls for accuracy relative to the zero mark if less than 0.1 degree. The vernier concept allows for a manufacturable scale as well.

Thus, a mechanic or technician examining the headlamp 22 through the viewing window 54 will be provided with an immediate indication as to the condition of the movable reflector 40 with respect to a desired vertical and horizontal zero position or orientation. That is to say, if the bubble level is not in alignment with the zero position, the technician need merely operate the vertical adjustment 140 to produce pivotal movement in the plane 162 as indicated in FIG. 6 until the zero position is attained. Correspondingly, if there is an indication of horizontal misalignment, the technician need merely operate the adjustor 106, FIG. 5, to pivot the movable reflector 40 in the horizontal plane as indicated by the arrow 120 until the zero indicia on the upper portion 172 of indicator 170 is in alignment with the zero indicia 178 on the calibration member 176. When the horizontal and vertical indicators are brought back to the zero position, the reflector 40 will be reoriented substantially to the factory set zero positions.

Attention is now invited to FIG. 10 wherein a somewhat schematic illustration of the horizontal indicator system of the present invention is shown. In this regard, it should be noted that the stationary or fixed pivot structure at location 58 is indicated schematically in FIG. 10 by the reference character 58', which is termed the fixed pivot point. Correspondingly, a structure which provides for the vertical adjustment of the reflector component 40 and defines the vertical pivot point is indicated at 60'. A more complete understanding can be had with reference to FIG. 6, wherein it will be noted that the points 58' and 60' correspond to the universal pivot points provided by the disposition of the spherical end portions on the studs or adjustment members 90 and 152 in the corresponding spherical sockets 96 and 146. The structure which provides for the universal pivot points for the fixed pivot 58 and the vertical pivot point 60 have not been shown in FIG. 9 for purposes of clarity. Correspondingly, the horizontal pivot point is indicated at 62', and corresponds to the disposition of the spherical portion 117 into the spherical bore 104, as illustrated in FIG. 5. The adjustment member 112 with its spherical end portion 117 having been illustrated in conjunction with the horizontal indicator arm 170.

As was discussed above, one of the problems with the prior art design as illustrated in U.S. Pat. No. 5,317,486 to Schmidt and U.S. Pat. No. 5,359,499 to Denley, the inventor herein, is that while the vertical and horizontal indicators were viewable through a common window, movement of the reflector component 40 in the vertical plane would tend to produce movement of the horizontal indicator due to its mounting proximate the upper surface of the reflector, thus giving a false indication of horizontal misalignment when in fact no such misalignment had occurred. Correspondingly, such movement might give an indication that horizontal alignment was correct when in fact this was not the case. The problem results from the overall geometry of the system.

Looking now to FIG. 10, the fixed pivot point 58' and the horizontal pivot point 62' define an axis 200 about which movement of the reflector 40 in the vertical plane will take place, said movement being indicated by the arrow 202. As such, the axis 200, while is actually oriented in a generally horizontal manner, is nevertheless herein termed the vertical pivot axis. The vertical pivot axis, 200, pivots about point 58' with the horizontal movement of the spherical end portion 117. Thus movement of the reflector 40 takes place which movement is indicated by the arrow 206. As such, the vertical axis, 200, is pivoted about point 58' in a horizontal plane. Thus, the "horizontal aim of the reflector 40", is synonymous with the horizontal aim of the vertical axis 200. Thus, the reflector plane defined by the pivot points 58', 60' and 62' rotates without rotating the horizontal indicator 50. With respect to the prior art designs discussed above, this is where error resulted, in that movement in the above-mentioned plane, resulted in movement of the horizontal indicator. It can be appreciated that in any given condition or orientation of the reflector 40, the vertical pivot point 60' and the horizontal pivot point 62' are not stationary and will move depending upon the position of the associated adjustment screws. That is, adjustment screw 112 with its spherical end portion 117 will determine the location of the pivot point 62' and correspondingly the axis 200. The adjustment screw 150 and the spherical end portion 152 thereon define the rotation of the reflector 40, i.e. plane (58', 60', 62'), relative to a horizontal plane who's edge view is the vertical axis, 200.

The problem with the prior art designs of the above-noted patents was that the horizontal indicator indicia were merely mounted to the upper surface of the movable reflector component 40 for viewing through the window adjacent the spirit or bubble level which provided the vertical indication. This positioning was done without regard for the general or overall geometry of the system and the orientation of the respective horizontal and vertical pivot axes 200 and 204. As such, the horizontal indicator was positioned remote from the vertical pivot axis such that vertical pivotal movement in the direction as indicated by the arrow 202 would result in movement of the horizontal indicator indicia or component thus producing a false indication of horizontal movement.

One of the significant features of the present invention, is that the indicator 170 is mounted to the reflector 40 at a point which is coaxial with the vertical pivot axis 200. This arrangement is illustrated in FIG. 10. As will become apparent from the discussion to follow, the mounting of the indicator 170 to the reflector 40 at a point coaxial with the vertical pivot axis will permit the reflector 40 to move or pivot in the vertical plane, arrow 202, without producing movement of the indicator arm 170. Correspondingly, the indicator 170 is keyed or fixed relative to the stationary components of the overall headlamp assembly so that it will not move when the reflector 40 is pivoted in the vertical plane. However, since the indicator arm 170 is mounted on the reflector 40 it will move with the reflector when it is pivoted in the horizontal plane about fixed pivot 58'.

More specifically with continued reference to FIG. 10, the indicator 170 is in the form of an elongate arm with the portion 172 and indicia 174 being proximate the upper end thereof. The upper portion 172 is disposed adjacent the calibration member 176 which it will be recalled is carried by the stationary housing 30. The lower portion of the indicator 170 includes a pivot pin 210 which is disposed within a boss or journal 212 of the reflector 40 for stability, best viewed in FIGS. 4 and 7. The boss or journal 212 while permitting the pin to rotate therein extends for greater than 180', so that the pin 210 is captured within said boss or journal 212. The boss or journal 212 as well as the pivot pin 210 is geometrically placed upon the vertical axis 200, the boss 212 being fixed or integral with the reflector 40. It is anticipated the pin and boss arrangement could be reversed, with the pin 210 being on the reflector 40 and the boss 212 on the indicator 170. Thus the horizontal indication arm 170 is mounted to the reflector 40, in a manner which permits relative pivotal movement. In FIG. 10, the pin 210 has been exaggerated somewhat in length for purposes of illustration and it is intended that this pin is disposed exactly the vertical axis 200, however is practical, given manufacturing tolerance, it is envisioned that precise coaxial alignment may not always be attained.

Thus, with momentary reference to FIG. 7, it can be seen that when the reflector 40 is pivoted in the vertical plane 202 (which corresponds to movement as indicated by the arrow 162) relative pivotal movement can take place between the reflector 40 and the horizontal indicator arm 170, without the indicator 170 moving from its position relative to the calibration member 176. The indicator arm 170 while being mounted to the reflector 40 must also be keyed or fixed against the aforementioned movement in the vertical plane 202. This can be attained by keying the indicator 170 directly to the stationary housing 30 or adopting some other structure which fixes the indicator 170 against movement in the vertical plane 202. The drawings illustrated a preferred form for fixing the position of the indicator 170 in that the indicator 170 is provided with a forked or bifurcated portion 214 proximate the lower end thereof, which in effect defines a slot 216 in which the adjustment screw 112 is disposed. Since the adjustment screw 112 is carried by the stationary housing 30 and is movable only linearly in effecting horizontal pivotal movement of the reflector 40 and the plane 206, the engagement of the bifurcated portion 214 with the adjusting screw 112 serves to fix the horizontal indicator arm 170 against pivotal movement in the vertical plane 202.

It should be kept in mind, however, that since the horizontal indicator arm 170 is carried by the pivotally mounted reflector 40 by means of the pin 210 being disposed in the journal or pivot boss 212, and being disposed in an aperture in arm 170, the indicator arm 170 will move in the horizontal plane 206 upon operation of the adjustment screw 112 to produce relative horizontal movement of the reflector 40.

Thus, it will be appreciated that by the mounting of the horizontal indicator for relative pivotal movement with respect to the reflector 40 with the mounting being coaxial with the axis 200 for pivotal vertical movement, and the subsequent fixing of the indicator arm 170 against movement in the vertical plane, the indicator arm 170 will move only upon adjustment of the headlamp by use of the horizontal adjust mechanism and adjusting screw 112. Correspondingly, the indication provided by the indicator arm 170 in conjunction with the calibration plate 176 thus provides a true indication of the relative position of the reflector 40 as determined by the adjusting screw 112 of the horizontal adjustor mechanism 106, and an indication that will not be affected materially by movement of the reflector 40 in the vertical plane.

Figure 11:
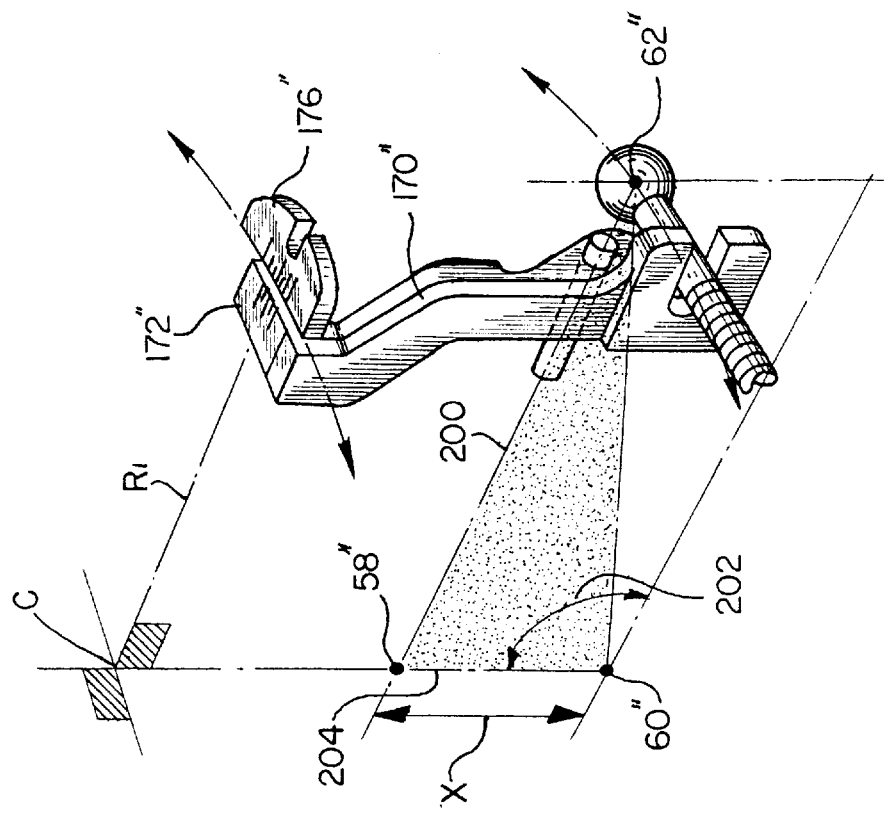
FIG. 11 is a schematic view similar to FIG. 10 but illustrating a modified form of the invention wherein the location of the respective pivot points have been re-positioned, which results in a horizontal indicator of a considerably shorter length than that of FIGS. 1–10.

The overall arrangement as illustrated in FIG. 10, that is with the vertical pivot 60' being disposed above the fixed pivot 58' tends to result in a relatively elongate indicia arm 170 in order to dispose the horizontal indicator portion 172 adjacent the fixed calibration member 176. FIG. 11 illustrates an arrangement which will enable the use of a much shorter horizontal indicator 170". In this regard, the fixed pivot point 58" has now been disposed above the vertical pivot point 60". Correspondingly, the horizontal pivot point 62" is disposed horizontally of the fixed pivot 58" and also has been raised by the distance X. This in effect raises the vertical pivot axis 200 moving the axis closer to the adjustably fixed calibration plate 176 and enabling the use of a shorter horizontal indicator arm 170.

Further, since the components as shown in FIG. 11 correspond to those of FIG. 10 identical reference characters have been employed and a detailed discussion has been omitted as it is believed apparent that the operation of the embodiment as shown in FIG. 11 will be identical to that of shown in FIG. 10, the only difference being that the fixed pivot point 58" and the horizontal pivot point 62" have been raised by the distance X thereby permitting the employment of a much shorter arm portion 170" for said indicator. It is believed that the accuracy of the system is enhanced by this arrangement.

FIG. 9 illustrates the construction of the rotatable viewing window 54 and its associated port 52 to which the window 54 is mounted. Also illustrated in FIG. 9 is the construction of a calibration member 176 which permits it to be mounted to the housing 30 proximate said port 52 for viewing through the rotatable viewing window 54. The manner of interconnection of the rotatable viewing window 54 to the calibration member 176 will also be discussed, such that upon rotation of the viewing window 54 desired movement of the calibration member 176 can be attained.

In this regard, the housing 30 is provided with a rim 220 which defines the generally circular port 52. The rim 220 includes three equally spaced bosses 222 each of which including a threaded aperture 224. In addition, a cordial shelf 226 is provided across a portion of the port 52, said shelf having a pair of arcuate slots 228 and 230 which are formed on the radius R1. The position of the shelf 226 and correspondingly the position of the slots 228 and 230 is selected such that the radius R1 is struck from a center or point on the horizontal axis 204 or an extension thereof, and is the perpendicular distance to the center of the fixed pivot 58. The radius R1 is illustrated in FIG. 10. The purpose for this will become apparent from the discussion which follows.

The calibration member 176 has indicia 178 on the upper surface thereof along with an aperture 232 in the form of an elongated slot. On the underside of the calibration member 176 are a pair of pin members 234, which pin members are receivable in the slots 220 and 230 thus mounting the calibration members 176 to the shelf 226 for sliding movement in an arc about the radius R1.

The viewing window 54 includes a central portion 236 which is formed by oppositely disposed convex surfaces, see FIG. 4, to provide for a degree of magnification when viewing through said window. A circumferential or ledge portion 238 is provided about the full periphery of the viewing window 54 which ledge portion includes three equally spaced arcuate slots 240. Most importantly, extending from the underside of the window 54 proximate the circumference thereof is a downwardly extending pin member 242.

Upon assembly of the components as illustrated in FIG. 9, the calibration member 176 is mounted to the shelf 226 by disposition of the pins 234 in the arcuate slots 228 and 230. Next, the viewing window 154 is placed in position with the pin member 242 disposed in the open slot 232, thus operatively interconnecting the window 54 with the calibration member 176. Next, the fasteners 242 are disposed through the slots 240 and engaged in the internally threaded bores 224 to effectively mount the viewing window 54 to the port 52. If desired, the viewing window 54 may also be provided with an annular groove 243 for reception of an O-ring 244 so that the mounting of the window 54 to the port 52 can be sealed, this arrangement being illustrated in FIG. 4 with the O-ring 244 engaged against the ledge 246, clearly viewable in FIG. 9.

Initially, upon assembly of the viewing window 54, the screws 242 are only partially or loosely connected. Thus, the window 54 may be rotated within the confines of the slots 240 producing sliding arcuate movement of the calibration member 176 along the arcuate slots 230 and 228. This arcuate movement is employed in order to zero out the horizontal indicator.

With reference to FIG. 8, there is an enlarged view similar to FIG. 3A. In this regard, it should be noted that the juxtaposed surfaces 176' and 172' of the calibration member 176 and the upper portion 172 of the horizontal indicator 170 are also arcuate, these surfaces being formed on the radius R1-S, the radius employed for the slots 228 and 230 less the distance S, FIG. 8. Accordingly, with reference to FIG. 8 and also FIGS. 3 and 3A, it can be appreciated that at the factory once the movable reflector component 40 of the headlamp is adjusted to the desired position, the zero point on the horizontal indicator 170 and the zero point on the calibration member 176 may not align, as shown in FIG. 8. (Note: They are illustrated in alignment in FIG. 3.) When this occurs, the technician will rotate the window 54 in the appropriate direction to bring the zero indicia on the calibration member 176 into alignment with the zero indicia 178 on the upper portion 172 of the horizontal indicator 170. This can be attained, since the viewing window is interconnected to the calibration member 176 by means of the pin 242 being disposed in the slot 232. It should be noted that the elongate nature of the slot 232 permits relative arcuate movement of the calibration member 176 about the radius R1 irrespective of the fact that the window may be rotating about a much smaller radius or arc, as the pin 242 will merely reciprocate in the slot 232 as necessary. Accordingly, once the viewing window 54 is rotated to bring the zero indicia on the calibration member 176 and the horizontal adjustment member 170 into alignment, the screws 242 can be tightened down to fix the zero position for the calibration member 176 of the horizontal indicator assembly. It can be appreciated that any subsequent movement of the reflector 40 in the horizontal plane will produce movement of the horizontal indicator arm 170 thus producing misalignment of the indicia 178 on the calibration member 176 with the indicia 174 on the horizontal indicator, which misalignment produce the desired visual indication.

In order to maintain the desired degree of accuracy as mandated by the Federal Department of Transportation Guidelines, the movement of the calibration member 176 and the adjoined arcuate surface 172' and 176' have been coordinated to the radius R1 thereby corresponding to movement about the same axis as the movable reflector 40. It is believed that this feature provides for increased accuracy as a mere linear movement or an arcuate movement about an axis other than the common axis of rotation of the reflector member and the horizontal plane will introduce errors into the overall system.

Figure 12:
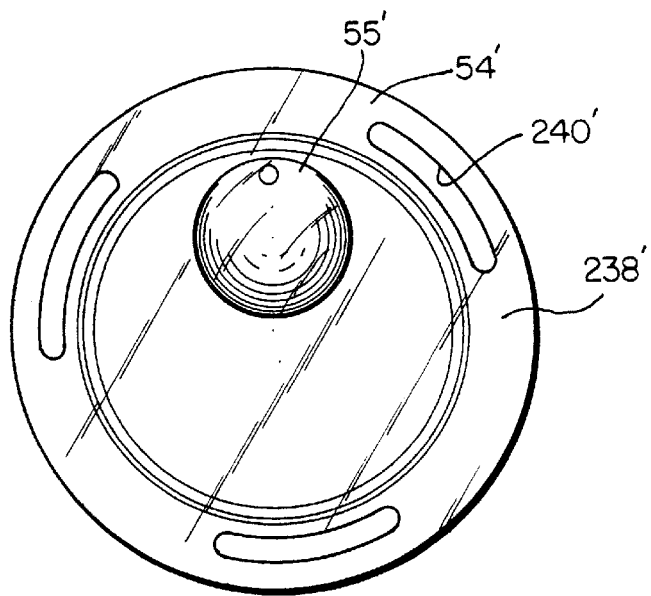
FIG. 12 is a modified form of the viewing lens, where in a higher magnification portion is provided for viewing the horizontal indicator.

In FIG. 12, there is illustrated a modified form of the viewing window 54, which is designated 54'. As will be recalled the viewing window 54 discussed above employed opposed concave surfaces to provide a relatively slight degree of magnification. Since the bubble level 70 is easily viewed through a lens with minimum magnification as per viewing window 54, increased magnification is desirable and needed only with respect to the viewing of the indicia on calibration member 176 and the horizontal indication upper portion 172. To provide for the increased magnification the viewing window 54' includes an additional magnification portion 55'.

In summary, there has been illustrated a preferred embodiment of the invention along with a slight modification as discussed with respect to FIG. 11 wherein the relative positioning of the fixed pivot, the vertical pivot and the horizontal pivot points have been altered slightly. The basic concept of the invention however is constant with respect to all embodiments illustrated in that the horizontal indicator 170 is mounted for relative movement with respect to the reflector 40 in the vertical plane and is fixed against said relative movement so that the reflector 40 can move independent of the horizontal indicator which is maintained in a fixed position due to a keying of the indicator to a component which is stationary with respect to the vertical plane such as the horizontal adjustment screw or alternately the stationary housing 30 or some other component of said housing 30. The interconnection of the horizontal adjustment member 170 with the movable reflector 40 is however such that when the reflector 40 is pivoted in the horizontal plane, the horizontal indicator 170 will move with the reflector 40 to provide a visual indication of its relative orientation. There is also provided a novel construction for mounting the calibration member 176 or the stationary indicia to be employed in conjunction with the movable indicia of the horizontal indicator 170 wherein said mounting takes in the overall geometry of the system so that any movement of the relatively stationary indicator or calibration member in order to attain zero positioning is struck about an arch from the fixed pivot employed in the horizontal pivoting or movement of the reflector. Thus, any movement of the fixed indicia carrying calibration member 176 will be about and are corresponding to the movement of the reflector thereby providing a more accurate system.

Again, while a preferred embodiment of the invention has been illustrated and described, it is envisioned that those skilled in the art may devise various modifications of the invention without the departing from the spirit and scope of the appended claims. In this regard, it is contemplated that there may be alternate ways or structure for achieving a pivotal mounting of the horizontal indicator with respect to the reflector 40 as well as alternate ways of fixing the horizontal indicator against pivotal movement in the vertical plane and insofar as these modifications fall within the spirit and the scope of the claims appended hereto they are considered to be in accordance with the invention and full equivalence of the structures illustrated herein and discussed above.

The invention claimed is:

1. Apparatus for providing a visual indication of the horizontal orientation of a movable component of a headlamp assembly including a stationary housing carrying a movable component which is pivotable in the vertical and horizontal planes about a fixed pivot point, a horizontal position indication associated with said movable component and including first indicia, a view opening in said housing proximate said first indicia, a selectively positionable calibration member carried by the stationary housing and having second indicia cooperable with said first indicia, said calibration member being mounted to a shelf portion provided in said opening, said shelf portion including at least one arcuate slot in which an extension of said calibration member is engaged; a rotatably mounted viewing window mounted over said opening, structure keying said viewing window to said calibration member such that rotation of said viewing window will produce selective positioning of said calibration member, and structure for selectively fixing the position of said viewing window and said calibration member.

2. Apparatus according to claim 1, wherein said at least one arcuate slot is formed on a radius of a perpendicular distance from the fixed pivot point.

3. Apparatus according to claim 1, wherein said first indicia are carried on and adjacent to an arcuate portion of the horizontal position indication, and said calibration member including an arcuate surface juxtaposed with said arcuate portion of the horizontal position indication both of said arcuate portion of the horizontal position indication and said arcuate surface of said calibration member being struck from a radius, the center of which lies on said fixed pivot point.

4. Apparatus for providing a visual indication of the horizontal and vertical orientation of a movable component of a headlight assembly, wherein said headlight assembly includes a stationary housing and a movable component movable in the vertical and horizontal planes, said apparatus including: a vertical position indicator carried by and movable with said movable component; a viewing opening on said housing and positioned to permit visual inspection of said vertical position indicator; a horizonal position indicator carried by said movable component; generally stationary indicia carried by said housing for cooperation with said horizontal position indicator to provide a visual indication of the horizontal position of said movable component; structure mounting said horizontal position indicator to said movable component so that said horizontal position indicator will move with said movable component when pivoted in the horizontal plane, but said horizontal position indicator will remain substantially stationary when said movable component is pivoted in the vertical plane, wherein said generally stationary indicia carried by said housing is selectively positionable to attain a zero indication relative to said horizontal position indicator, once the movable component is in the desired horizontal orientation such that any movement of the movable component from said desired horizontal orientation will produce a visual indication due to misalignment of said horizontal position indicator with respect to said indicia.

5. An apparatus according to claim 4, wherein said viewing opening includes a transparent cover which is operatively associated with said stationary indicia, said cover being selectively rotatable along with said indica for attaining said zero indication.

6. Apparatus for providing a visual indication of the horizontal and vertical orientation of a movable component of a headlight assembly, wherein said headlight assembly includes a stationary housing and a movable component movable in the vertical and horizontal planes, said apparatus including: a vertical position indicator carried by and movable with said movable component; a viewing opening on said housing and positioned to permit visual inspection of said vertical position indicator; a horizonal position indicator carried by said movable component; generally stationary indicia carried by said housing for cooperation with said horizontal position indicator to provide a visual indication of the horizontal position of said movable component; structure mounting said horizontal position indicator to said movable component so that said horizontal position indicator will move with said movable component when pivoted in the horizontal plane, but said horizontal position indicator will remain substantially stationary when said movable component is pivoted in the vertical plane, wherein said generally stationary indicia are carried proximal said viewing opening so that both said vertical and said horizontal position indications are viewable through said opening.

7. Apparatus for providing a visual indication of the horizontal orientation of a movable component of a headlight assembly, wherein said headlight assembly includes a stationary housing and a movable component for movement in the horizontal and vertical planes, said apparatus including: a horizonal position indicator carried by said movable component and including first indicia thereon; second, generally stationary indicia carried by said housing for cooperation with said first indicia to provide a visual indication of the horizontal position of said movable component; structure mounting said horizontal position indicator to said movable component so that said horizontal position indicator will move with said movable component when pivoted in the horizontal plane, but said horizontal position indicator will remain substantially stationary when said movable component is pivoted in the vertical plane, wherein said generally stationary indicia carried by said housing is selectively positionable to attain a zero indication relative to said first indicia once the movable component is in the desired horizontal orientation such that any movement of the movable component from the desired horizontal orientation will produce a visual indication due to misalignment of the first indicia with respect to said second indicia.

8. Apparatus according to claim 7, wherein said housing includes a viewing opening, wherein said second, generally stationary indicia is on a indicia carrying member which is mounted for arcuate movement proximal said opening, a rotatably mounted viewing window covering said opening, wherein said window is keyed to said housing such that said window can be rotated such that selective rotation of said window can be used to adjust the position of said second indicia relative to said first indicia to provide said zero indication, with the position of the window and the indicia carrying member being configured to be fixed thereafter.

9. Apparatus according to claim 7, in combination with a vertical position indication in the form of spirit level carried by said movable component, said vertical position indication and at least a portion of said horizontal position indication being positionable adjacent a viewing opening provided in said stationary housing to permit viewing therethrough at the same general location.

10. Apparatus for providing a visual indication of the horizontal orientation of a movable component of a headlight assembly, wherein said headlight assembly includes a stationary housing and a movable component for movement in the horizontal and vertical planes, said apparatus including: a horizonal position indicator carried by said movable component and including first indicia thereon; second, generally stationary indicia carried by said housing for cooperation with said first indicia to provide a visual indication of the horizontal position of said movable component; structure mounting said horizontal position indicator to said movable component so that said horizontal position indicator will move with said movable component when pivoted in the horizontal plane, but said horizontal position indicator will remain substantially stationary when said movable component is pivoted in the vertical plane, wherein said horizontal position indicator is pivotally mounted relative to said movable component to permit relative movement therebetween, and there is provided structure fixing said horizontal position indicator against pivotal movement in the vertical plane, such that when said movable component is pivoted in the vertical plane, the movable component will pivot relative to the horizontal position indicator which remains relatively stationary, wherein said movable component is mounted to said housing by a fixed pivot and there is provided horizontal and vertical adjustment mechanisms each including a selectably movable adjustment member operatively connected to said movable component at a first pivot point and a second pivot point, respectively, wherein said second pivot point defines a pivot axis with said fixed pivot, wherein said structure mounting said horizontal position indicator to said movable component includes a pivot which is substantially coaxial with said pivot axis.

11. Apparatus for providing a visual indication of the horizontal orientation of a movable component of a headlight assembly, wherein said headlight assembly includes a stationary housing and a movable component for movement in the horizontal and vertical planes, said apparatus including: a horizonal position indicator carried by said movable component and including first indicia thereon; second, generally stationary indicia carried by said housing for cooperation with said first indicia to provide a visual indication of the horizontal position of said movable component; structure mounting said horizontal position indicator to said movable component so that said horizontal position indicator will move with said movable component when pivoted in the horizontal plane, but said horizontal position indicator will remain substantially stationary when said movable component is pivoted in the vertical plane, wherein said movable component is pivotable in the vertical plane about a pivot axis, and a pin on said horizontal position indicator is pivotally mounted in a boss on said movable component at a point which is co-axial with said pivot axis, so that said movable component can pivot in the vertical plane, relative to said horizontal position indicator.

12. Apparatus according to claim 11, further comprising structure which fixes said horizontal position indicator against pivotal movement in the vertical plane.

13. Apparatus according to claim 12, where said structure fixing said horizontal position indicator against pivotal movement in the vertical plane includes an extended portion on said horizontal position indicator engaged with a component fixed against vertical movement.

14. Apparatus according to claim 13, wherein said extended portion on said horizontal position indicator is engaged with a horizontal adjustment mechanism.

15. Apparatus for providing a visual indication of the horizontal orientation of a movable component of a headlight assembly, wherein said headlight assembly includes a stationary housing and a movable component for movement in said housing in the horizontal and vertical planes, said apparatus including: a horizonal position indicator carried by said movable component and including first indicia thereon; second, generally stationary indicia carried by said housing for cooperation with said first indicia on said horizontal position indicator to provide a visual indication of a horizontal position of said movable component; structure mounting said horizontal position indicator to said movable component so that said horizontal position indicator will move with said movable component when said movable component pivots in the horizontal plane, but said horizontal position indicator will remain substantially stationary when said movable component pivots in the vertical plane, wherein said horizontal position indicator is pivotally mounted relative to said movable component to permit relative movement therebetween, and there is provided structure fixing said horizontal position indicator against pivotal movement in the vertical plane, such that when said movable component is pivoted in the vertical plane, said movable component will pivot relative to said horizontal position indicator which remains relatively stationary.

16. Apparatus for providing a visual indication of the horizontal orientation of a movable component of a headlight assembly, wherein said headlight assembly includes a stationary housing and a movable component for movement in the horizontal and vertical planes, said apparatus including: a horizonal position indicator carried by said movable component and including first indicia thereon; second, generally stationary indicia carried by said housing for cooperation with said first indicia on said horizontal position indicator to provide a visual indication of a horizontal position of said movable component; structure mounting said horizontal position indicator to said movable component so that said horizontal position indicator will move with said movable component when said movable component pivots in the horizontal plane, but said horizontal position indicator will remain substantially stationary when said movable component pivots in the vertical plane, wherein said movable component is pivotably mounted for movement in the vertical and horizontal planes about a pivot axis and a pivot point, respectively, and a pivotal mounting attaching said horizontal position indicator to said movable component is coaxial with the pivot axis.

17. Apparatus for providing a visual indication of the horizontal orientation of a movable component of a headlamp assembly wherein said headlamp assembly includes a stationary housing and a movable component, said movable component being mounted for pivotal movement relative to the stationary housing for movement in the vertical and horizontal planes about a pivot axis and a pivot point, respectively, said horizontal position indicator including an arm member and a pivotal connection affixing said arm member to said movable component, said pivotal connection being coaxial with said pivot axis, and structure fixing said arm member of said horizontal position indicator against movement in the vertical plane, such that said movable component can pivot independently of said arm member in the vertical plane, with pivotal movement of said movable component in the horizontal plane producing horizontal movement of said arm member.

18. Apparatus according to claim 17, wherein said arm member includes an end portion positioned adjacent a surface of said housing, first indicia on said arm member end portion, a calibration member adjustably mounted to said housing and having second indicia thereon, mounting structure associated with said calibration member permitting the position of said calibration member to be adjusted and then selectively fixed.

* * * * *